(12) United States Patent
Gamez

(10) Patent No.: US 10,544,553 B1
(45) Date of Patent: Jan. 28, 2020

(54) SURFACE MARKING ASSEMBLY

(71) Applicant: Manuel Gamez, Labelle, FL (US)

(72) Inventor: Manuel Gamez, Labelle, FL (US)

( * ) Notice: Subject to any disclaimer, the term of this patent is extended or adjusted under 35 U.S.C. 154(b) by 0 days.

(21) Appl. No.: 15/654,705

(22) Filed: Jul. 20, 2017

(51) Int. Cl.
| *E01F 9/00* | (2016.01) |
| *E01F 9/559* | (2016.01) |
| *E01F 9/673* | (2016.01) |
| *E01F 9/20* | (2016.01) |
| *F21S 9/03* | (2006.01) |
| *F21V 8/00* | (2006.01) |
| *F21W 111/02* | (2006.01) |

(52) U.S. Cl.
CPC ............. *E01F 9/559* (2016.02); *E01F 9/20* (2016.02); *E01F 9/675* (2016.02); *F21S 9/03* (2013.01); *G02B 6/0055* (2013.01); *F21W 2111/02* (2013.01)

(58) Field of Classification Search
CPC ... E01F 9/20; E01F 9/559; E01F 9/675; F21S 9/03; G02B 6/0055
USPC ............................................ 404/6, 9, 12–16
See application file for complete search history.

(56) References Cited

U.S. PATENT DOCUMENTS

| 2,073,166 | A | * | 3/1937 | Moorman | ............... | E01F 9/553 |
| | | | | | | 404/16 |
| 2,127,233 | A | * | 8/1938 | Older | ...................... | E01F 9/578 |
| | | | | | | 404/12 |
| 3,716,445 | A | * | 2/1973 | Lemelson | ................. | B44F 1/04 |
| | | | | | | 236/9 R |
| 3,836,275 | A | * | 9/1974 | Finch | .................... | E01C 11/265 |
| | | | | | | 404/13 |
| 3,894,225 | A | * | 7/1975 | Chao | ....................... | G09F 13/28 |
| | | | | | | 174/117 A |
| 4,570,207 | A | * | 2/1986 | Takahashi | ............... | E01F 9/582 |
| | | | | | | 340/944 |
| 4,668,120 | A | | 5/1987 | Roberts | | |
| 4,925,335 | A | * | 5/1990 | Eigenmann | ...... | G08G 1/096716 |
| | | | | | | 404/12 |
| 5,833,386 | A | * | 11/1998 | Rosan | ..................... | E01C 9/086 |
| | | | | | | 404/36 |
| 5,984,570 | A | | 11/1999 | Parashar | | |
| 6,027,280 | A | * | 2/2000 | Conners | .................. | E01C 17/00 |
| | | | | | | 362/153.1 |
| 6,116,751 | A | * | 9/2000 | Remp | ..................... | E01C 17/00 |
| | | | | | | 362/153 |

(Continued)

FOREIGN PATENT DOCUMENTS

WO    WO2013043061     3/2013

*Primary Examiner* — Raymond W Addie

(57) ABSTRACT

A surface marking assembly for providing guidance to vehicle operators includes first and second panels. The first panel is configured to couple to a surface, such as tarmac of a road. A plurality of solar cells is coupled to a top of the first panel. At least one battery is coupled to the first panel and is operationally coupled to the solar cells, which are configured to charge the battery. A plurality of bulbs is coupled to the first panel and is operationally coupled to the battery. The second panel, which is textured and substantially transparent, is coupled to the first panel to protect the solar cells and the bulbs. The battery is positioned to power the bulbs to provide visual direction to an operator of a vehicle proximate to the first panel. The second panel is configured to provide vibratory and auditory notifications to the operator.

11 Claims, 4 Drawing Sheets

(56) References Cited

U.S. PATENT DOCUMENTS

| | | | | |
|---|---|---|---|---|
| 6,755,550 B1* | 6/2004 | Lackey | ................... | F21S 8/024 |
| | | | | 362/147 |
| 7,018,131 B2 | 3/2006 | Jordan | | |
| 7,070,294 B2* | 7/2006 | Patti | ........................ | E01C 17/00 |
| | | | | 362/153 |
| 7,316,519 B2* | 1/2008 | Ryman | ................... | G09F 19/22 |
| | | | | 404/17 |
| D565,447 S | 4/2008 | Horng | | |
| 7,688,222 B2 | 3/2010 | Peddie et al. | | |
| 7,967,525 B2* | 6/2011 | Valle | ...................... | E01C 19/35 |
| | | | | 359/547 |
| 8,235,542 B2* | 8/2012 | Yohananoff | ............ | E01C 17/00 |
| | | | | 362/153 |
| 8,672,578 B2* | 3/2014 | Blocken | ................. | E01C 17/00 |
| | | | | 362/153.1 |
| 8,985,893 B2 | 3/2015 | Marlin et al. | | |
| 9,169,607 B2 | 10/2015 | Schweizer | | |
| 2002/0006313 A1* | 1/2002 | Pas | ........................ | E01F 9/582 |
| | | | | 404/13 |
| 2003/0090896 A1* | 5/2003 | Sooferian | ............... | E01C 17/00 |
| | | | | 362/183 |
| 2005/0024868 A1* | 2/2005 | Nagai | ...................... | F21K 9/90 |
| | | | | 362/227 |
| 2007/0263381 A1* | 11/2007 | Goldman | ................ | F21S 9/032 |
| | | | | 362/183 |
| 2010/0182775 A1* | 7/2010 | Chang | ...................... | F21K 9/00 |
| | | | | 362/184 |
| 2012/0114415 A1* | 5/2012 | Blocken | ................. | E01C 17/00 |
| | | | | 404/34 |
| 2012/0275859 A1* | 11/2012 | Caroli | .................... | E01C 5/001 |
| | | | | 404/22 |

\* cited by examiner

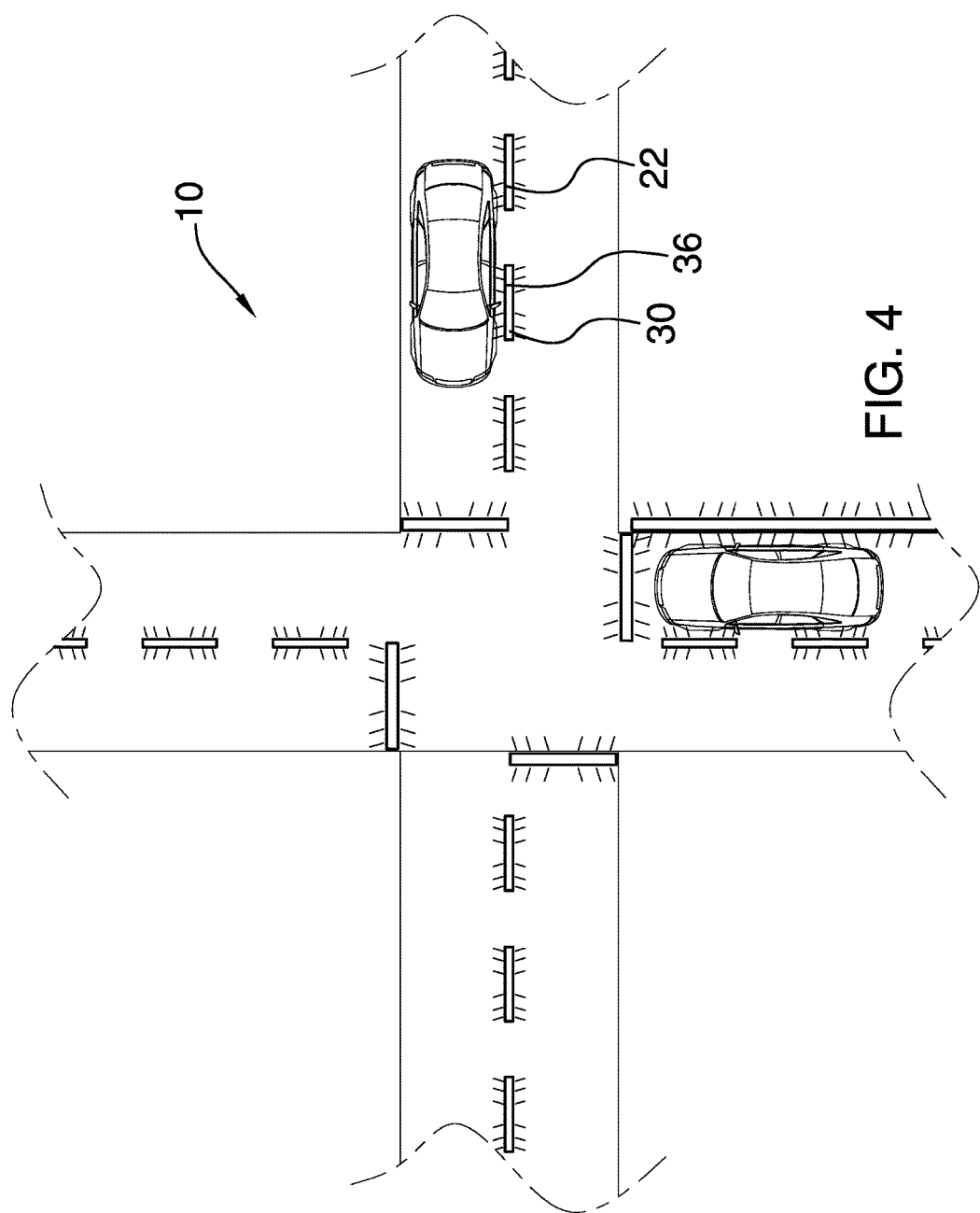

SURFACE MARKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to marking assemblies and more particularly pertains to a new marking assembly for providing guidance to vehicle operators.

BRIEF SUMMARY OF THE INVENTION

An embodiment of the disclosure meets the needs presented above by generally comprising first and second panels. The first panel is configured to couple to a surface, such as tarmac of a road. A plurality of solar cells is coupled to a top of the first panel. At least one battery is coupled to the first panel and is operationally coupled to the solar cells, which are configured to charge the battery. A plurality of bulbs is coupled to the first panel and is operationally coupled to the battery. The second panel, which is textured and substantially transparent, is coupled to the first panel to protect the solar cells and the bulbs. The battery is positioned to power the bulbs to provide visual direction to an operator of a vehicle proximate to the first panel. The second panel is configured to provide vibratory and auditory notifications to the operator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is an in-use view of an embodiment of the disclosure.

DETAILED DESCRIPTION OF THE INVENTION

Figure 1:
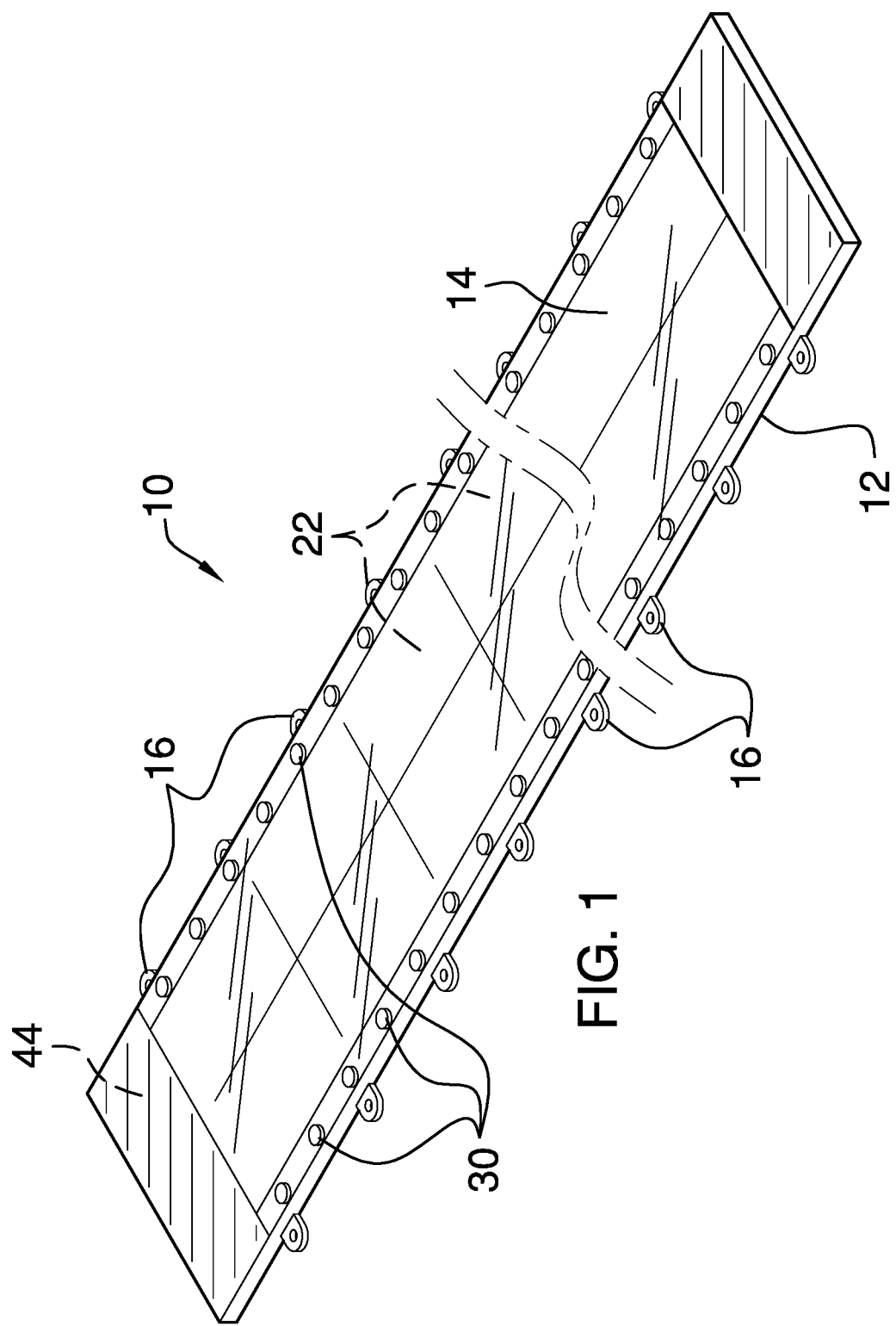
FIG. 1 is an isometric perspective view of a surface marking assembly according to an embodiment of the disclosure.
Figure 2:
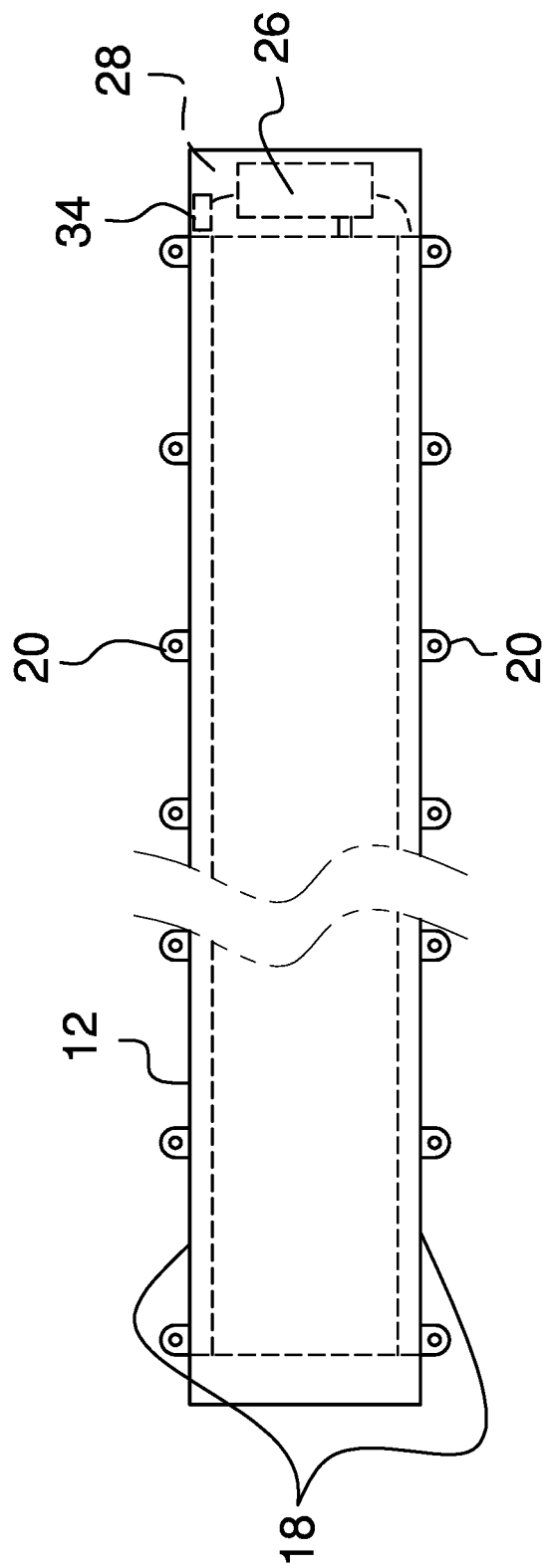
FIG. 2 is a bottom view of an embodiment of the disclosure.
Figure 3:
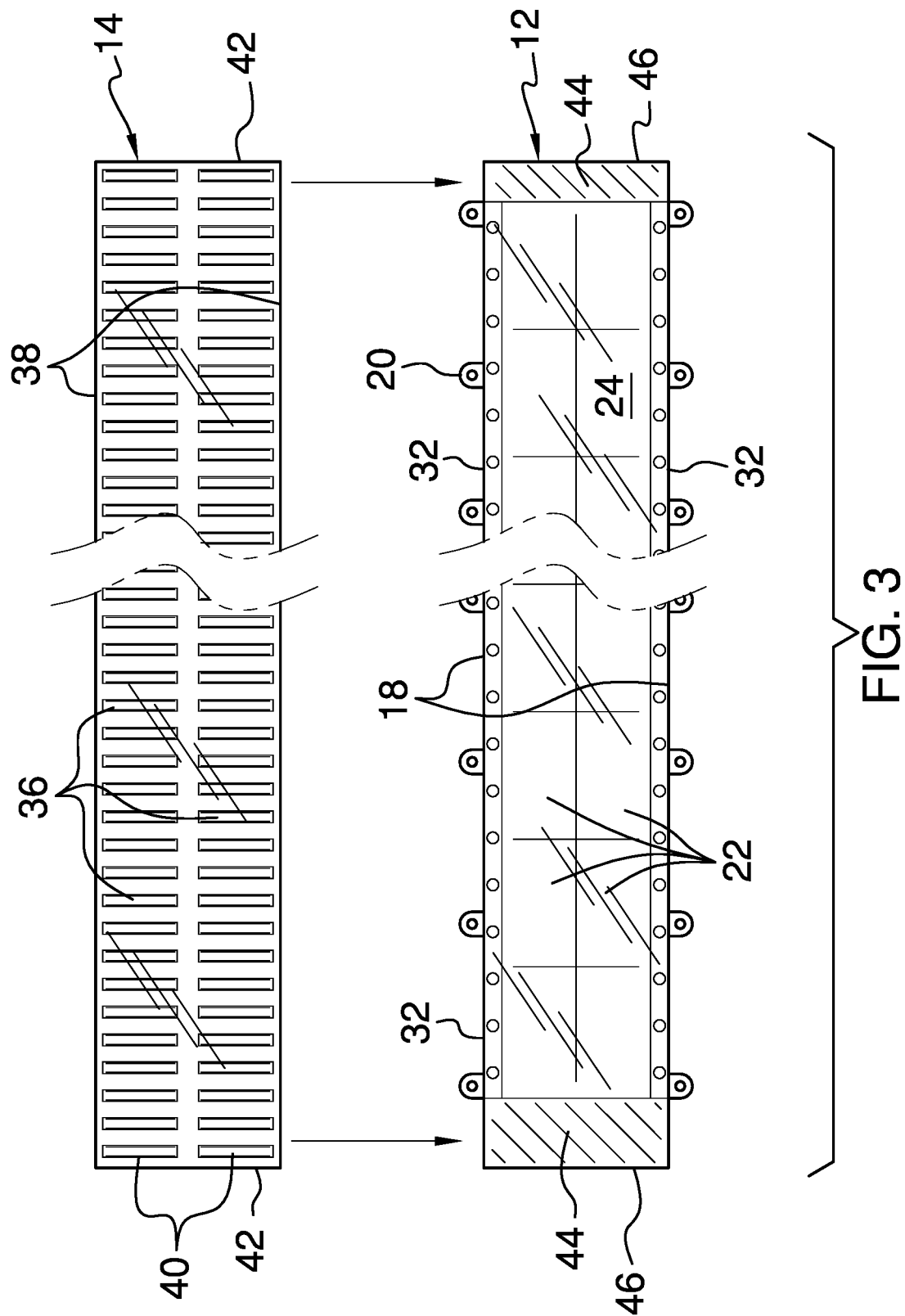
FIG. 3 is an exploded view of an embodiment of the disclosure.

With reference now to the drawings, and in particular to FIGS. 1 through 4 thereof, a new marking assembly embodying the principles and concepts of an embodiment of the disclosure and generally designated by the reference numeral 10 will be described.

As best illustrated in FIGS. 1 through 4, the surface marking assembly 10 generally comprises a first panel 12 and a second panel 14. The first panel 12 is configured to couple to a surface, such as tarmac of a road. In one embodiment, the first panel 12 is elongated rectangularly shaped.

Each of a plurality of fasteners 16 is coupled to a respective opposing side 18 of the first panel 12. The fasteners 16 are configured to couple to the surface, such as the tarmac of the road, to couple the first panel 12 to the surface. In one embodiment, each fastener 16 comprises a tab 20 that is coupled to and extends from the first panel 12. Each tab 20 is singly holed so that each tab 20 is configured to insert hardware, such as a bolt and a spike, to couple the first panel 12 to the surface.

A plurality of solar cells 22 is coupled to a top 24 of the first panel 12. At least one battery 26 is coupled to the first panel 12. The at least one battery 26 is operationally coupled to the plurality of solar cells 22. The solar cells 22 are configured to charge the at least one battery 26. In one embodiment, a cavity 28 is positioned in the first panel 12 proximate to a respective opposing end 46 of the first panel 12. The at least one battery 26 is positioned in the cavity 28.

A plurality of bulbs 30 is coupled to the first panel 12. The plurality of bulbs 30 is operationally coupled to the at least one battery 26. The at least one battery 26 is positioned to power the bulbs 30 to illuminate an area proximate to the first panel 12 to provide visual direction to an operator of a vehicle proximate to the first panel 12, such as a driver of an automobile. In one embodiment, each bulb 30 is positioned on the top 24 proximate to the respective opposing side 18 of the first panel 12. In another embodiment, each bulb 30 comprises a light emitting diode 32. In yet another embodiment, the plurality of bulbs 30 comprises bulbs 30 that emit a color of light selected from the set of colors of light that consists of white, red, green, and yellow.

A sensor switch 34 is coupled to the first panel 12. The sensor switch 34 is operationally coupled to the plurality of bulbs 30 and the at least one battery 26. The sensor switch 34 is configured to detect sunlight. The sensor switch 34 also is configured to selectively couple the bulbs 30 to the at least one battery 26. The sensor switch 34 is positioned to couple the at least one battery 26 to the bulbs 30 to illuminate the area proximate to the first panel 12 to provide the visual direction to the operator of the vehicle proximate to the first panel 12, such as the driver of the automobile. The sensor switch 34 is configured to detect the sunlight and is positioned to decouple the bulbs 30 from the at least one battery 26.

The second panel 14 is substantially complementary to the first panel 12. The second panel 14 is coupled to the first panel 12 so that the second panel 14 is positioned over the solar cells 22 and the bulbs 30. The second panel 14 is configured to protect the solar cells 22 and the bulbs 30 from damage. The second panel 14 is textured and substantially transparent. The second panel 14 also is configured to provide a vibratory notification and an auditory notification to the operator of the vehicle when wheels of the vehicle rotationally contact the second panel 14. In one embodiment, the second panel 14 comprises silicon resin.

A plurality of ridges 36 is coupled to and extends upwardly from the second panel 14. The ridges 36 are configured to provide the vibratory notification and the auditory notification to the operator of the vehicle when the wheels of the vehicle rotationally contact the ridges 36. In one embodiment, the ridges 36 extend from proximate to opposing edges 38 of the second panel 14. In another embodiment, the ridges 36 are positioned in a pair of rows 40. Each row 40 extends from proximate to opposing endpoints 42 of the second panel 14.

Each of a pair of strips 44 is positioned between the first panel 12 and the second panel 14 adjacent to a respective opposing end 46 of the first panel 12. The strips 44 are reflective. The strips 44 are configured to reflect light that impinges upon the strips 44 to provide visual notice to the operator of the vehicle proximate to the first panel 12, such as the driver of the automobile.

In use, each tab 20 that is positioned on the first panel 12 is configured to insert hardware, such as the bolt and the spike, to couple the first panel 12 to the surface. The solar cells 22 are configured to charge the at least one battery 26. The sensor switch 34 is positioned to couple the at least one battery 26 to the bulbs 30 to illuminate the area proximate to the first panel 12 to provide the visual direction to the operator of the vehicle proximate to the first panel 12, such as the driver of the automobile. The sensor switch 34 is configured to detect the sunlight and to decouple the bulbs 30 from the at least one battery 26. The second panel 14 is configured to protect the solar cells 22 and the bulbs 30 from damage. The ridges 36 that are positioned on the second panel 14 are configured to provide the vibratory notification and the auditory notification to the operator of the vehicle when the wheels of the vehicle rotationally contact the ridges 36. The strips 44 that are positioned on the first panel 12 are configured to reflect the light that impinges upon the strips 44 to provide the visual notice to the operator of the vehicle proximate to the first panel 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A surface marking assembly comprising:
  a first panel configured for coupling to a surface;
  a plurality of solar cells coupled to a top of said first panel;
  at least one battery coupled to said first panel, said at least one battery being operationally coupled to said plurality of solar cells;
  a plurality of bulbs coupled to said first panel, said bulbs being operationally coupled to said at least one battery;
  a second panel substantially complementary to said first panel, said second panel comprising silicon resin, said second panel being coupled to said first panel such that said second panel is positioned over said solar cells and said bulbs, said second panel being textured and substantially transparent;
  wherein said solar cells are positioned on said first panel such that said solar cells are configured for charging said at least one battery, wherein said bulbs are positioned on said first panel such that said at least one battery is positioned for powering said bulbs for illuminating an area proximate to said first panel for providing visual direction to an operator of a vehicle proximate to said first panel, wherein said second panel is positioned on said first panel such that said second panel is configured for protecting said solar cells and said bulbs from damage and wherein said second panel is configured for providing a vibratory notification and an auditory notification to the operator of the vehicle when wheels of the vehicle rotationally contact said second panel;
  a plurality of fasteners, each said fastener being coupled to a respective opposing side of said first panel, said fasteners being configured for coupling to the surface, wherein said fasteners are positioned on said first panel such that said fasteners are configured for coupling to the surface to couple the first panel to the surface, each said fastener comprising a tab coupled to and extending from said first panel, each said tab being singly holed, wherein said tabs are positioned on said first panel such that each said tab is configured for inserting hardware for coupling said first panel to the surface; and
  a cavity positioned in said first panel proximate to a respective opposing end of said first panel, said at least one battery being positioned in said cavity.

2. The assembly of claim 1, further including said first panel being elongated rectangularly shaped.

3. The assembly of claim 1, further including each said bulb being positioned on said top proximate to a respective opposing side of said first panel.

4. The assembly of claim 1, further including each said bulb comprising a light emitting diode.

5. The assembly of claim 1, further including said plurality of bulbs comprising said bulbs emitting a color of light selected from the set of colors of light consisting of white, red, green, and yellow.

6. The assembly of claim 1, further including a sensor switch coupled to said first panel, said sensor switch being operationally coupled to said plurality of bulbs and said at least one battery, said sensor switch being configured for detecting sunlight and for selectively coupling said bulbs to said at least one battery, wherein said sensor switch is positioned on said first panel such that said sensor switch is positioned for coupling said at least one battery to said bulbs for illuminating the area proximate to said first panel for providing the visual direction to the operator of the vehicle proximate to said first panel, wherein said sensor switch is positioned on said first panel such that said sensor switch is configured for detecting the sunlight such that said sensor switch is positioned for decoupling said bulbs from said at least one battery.

7. The assembly of claim 1 further including a pair of strips, said strips being reflective, each said strip being positioned between said first panel and said second panel adjacent to a respective opposing end of said first panel, wherein said strips are positioned on said first panel such that said strips are configured for reflecting light impinging upon said strips for providing visual notice to the operator of the vehicle proximate to said first panel.

8. The assembly of claim 1, further including a plurality of ridges coupled to and extending upwardly from said second panel, wherein said ridges are positioned on said second panel such that said ridges are configured for providing the vibratory notification and the auditory notification to the operator of the vehicle when the wheels of the vehicle rotationally contact said ridges.

9. The assembly of claim 8, further including said ridges extending from proximate to opposing edges of said second panel.

10. The assembly of claim 9, further including said ridges being positioned in a pair of rows, each said row extending from proximate to opposing endpoints of said second panel.

11. A surface marking assembly comprising:
a first panel configured for coupling to a surface, said first panel being elongated rectangularly shaped;
a plurality of fasteners, each said fastener being coupled to a respective opposing side of said first panel, said fasteners being configured for coupling to the surface wherein said fasteners are positioned on said first panel such that said fasteners are configured for coupling to the surface to couple the first panel to the surface, each said fastener comprising a tab coupled to and extending from said first panel, each said tab being singly holed, wherein said tabs are positioned on said first panel such that each said tab is configured for inserting hardware for coupling said first panel to the surface;
a plurality of solar cells coupled to a top of said first panel;
a cavity positioned in said first panel proximate to a respective opposing end of said first panel;
at least one battery coupled to said first panel, said at least one battery being operationally coupled to said plurality of solar cells, wherein said solar cells are positioned on said first panel such that said solar cells are configured for charging said at least one battery, said at least one battery being positioned in said cavity;
a plurality of bulbs coupled to said first panel, said bulbs being operationally coupled to said at least one battery, wherein said bulbs are positioned on said first panel such that said at least one battery is positioned for powering said bulbs for illuminating an area proximate to said first panel for providing visual direction to an operator of a vehicle proximate to said first panel, each said bulb being positioned on said top proximate to said respective said opposing side of said first panel, each said bulb comprising a light emitting diode, said plurality of bulbs comprising said bulbs emitting a color of light selected from the set of colors of light consisting of white, red, green and yellow;
a sensor switch coupled to said first panel, said sensor switch being operationally coupled to said plurality of bulbs and said at least one battery, said sensor switch being configured for detecting sunlight and for selectively coupling said bulbs to said at least one battery, wherein said sensor switch is positioned on said first panel such that said sensor switch is positioned for coupling said at least one battery to said bulbs for illuminating the area proximate to said first panel for providing the visual direction to the operator of the vehicle proximate to said first panel, wherein said sensor switch is positioned on said first panel such that said sensor switch is configured for detecting the sunlight such that said sensor switch is positioned for decoupling said bulbs from said at least one battery;
a second panel substantially complementary to said first panel, said second panel being coupled to said first panel such that said second panel is positioned over said solar cells and said bulbs, said second panel being textured and substantially transparent, wherein said second panel is positioned on said first panel such that said second panel is configured for protecting said solar cells and said bulbs from damage and wherein said second panel is configured for providing a vibratory notification and an auditory notification to the operator of the vehicle when wheels of the vehicle rotationally contact said second panel, said second panel comprising silicon resin;
a plurality of ridges coupled to and extending upwardly from said second panel, wherein said ridges are positioned on said second panel such that said ridges are configured for providing the vibratory notification and the auditory notification to the operator of the vehicle when the wheels of the vehicle rotationally contact said ridges, said ridges extending from proximate to opposing edges of said second panel, said ridges being positioned in a pair of rows, each said row extending from proximate to opposing endpoints of said second panel;
a pair of strips, said strips being reflective, each said strip being positioned between said first panel and said second panel adjacent to a respective said opposing end of said first panel, wherein said strips are positioned on said first panel such that said strips are configured for reflecting light impinging upon said strips for providing visual notice to the operator of the vehicle proximate to said first panel; and
wherein said tabs are positioned on said first panel such that each said tab is configured for inserting the hardware for coupling said first panel to the surface, wherein said solar cells are positioned on said first panel such that said solar cells are configured for charging said at least one battery, wherein said sensor switch is positioned on said first panel such that said sensor switch is positioned for coupling said at least one battery to said bulbs for illuminating the area proximate to said first panel for providing the visual direction to the operator of the vehicle proximate to said first panel, wherein said sensor switch is positioned on said first panel such that said sensor switch is configured for detecting the sunlight such that said sensor switch is positioned for decoupling said bulbs from said at least one battery, wherein said second panel is positioned on said first panel such that said second panel is configured for protecting said solar cells and said bulbs from damage, wherein said ridges are positioned on said second panel such that said ridges are configured for providing the vibratory notification and the auditory notification to the operator of the vehicle when the wheels of the vehicle rotationally contact said ridges, wherein said strips are positioned on said first panel such that said strips are configured for reflecting light impinging upon said strips for providing the visual notice to the operator of the vehicle proximate to said first panel.

* * * * *